May 2, 1939.  S. D. VIGREN ET AL  2,156,465
SET OF CONTACT SPRINGS FOR ELECTRICAL SWITCHING APPARATUS
Filed March 10, 1936   2 Sheets-Sheet 1
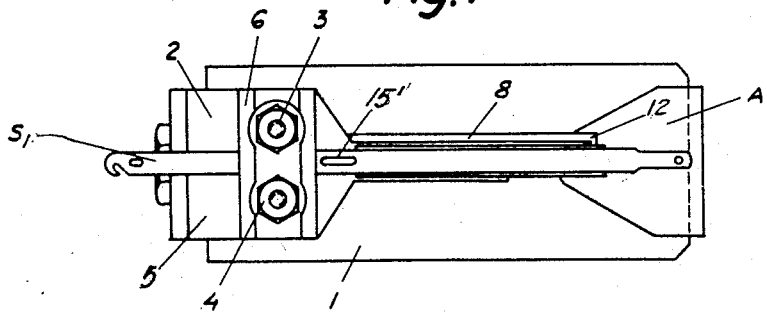
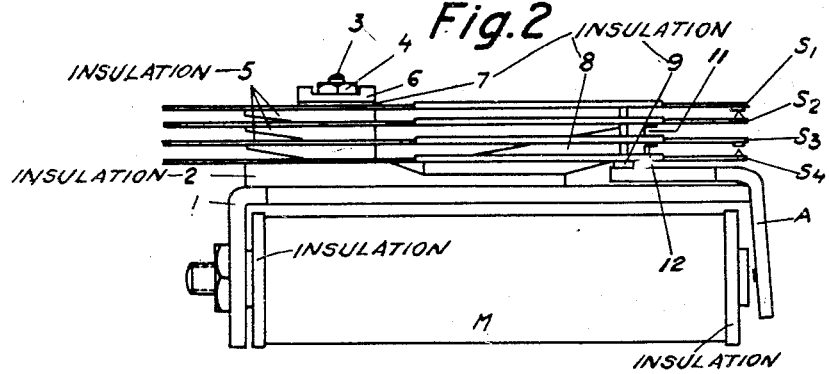
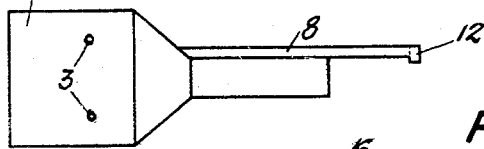
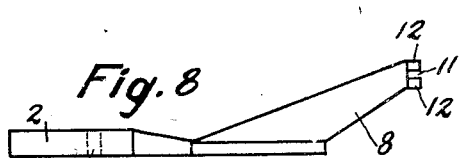
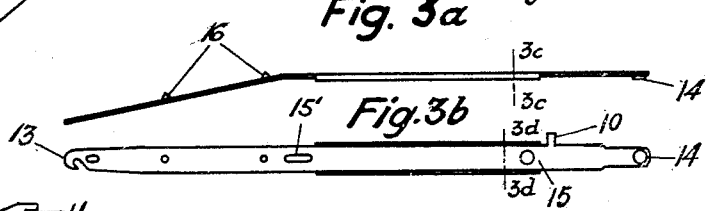
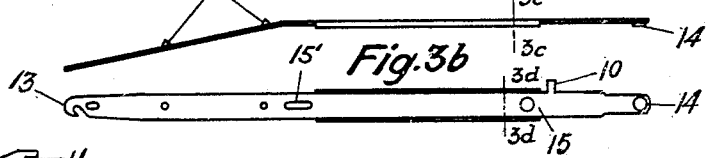
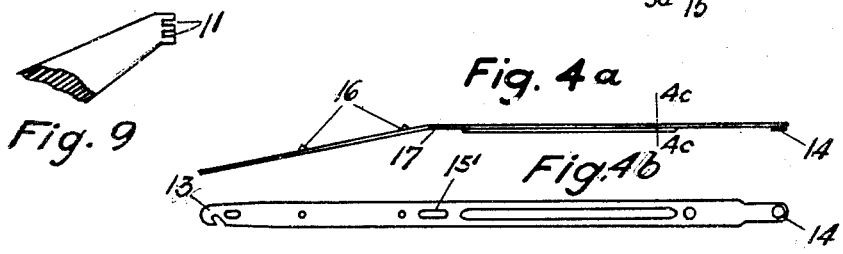
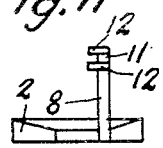
STEN DANIEL VIGREN + SVEN GUSTAF PILIP BLOMQUIST
INVENTORS
BY
their ATT'Y

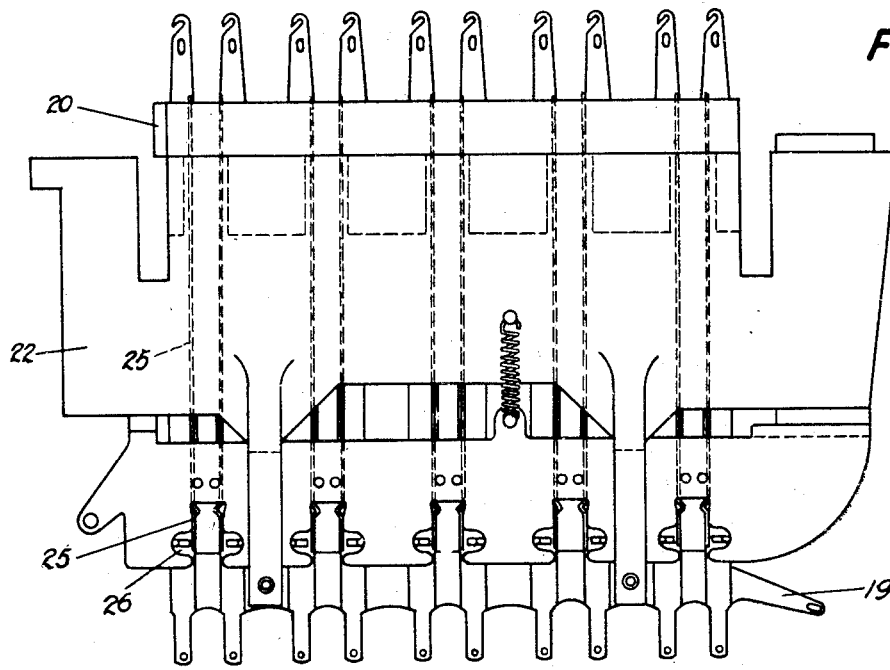
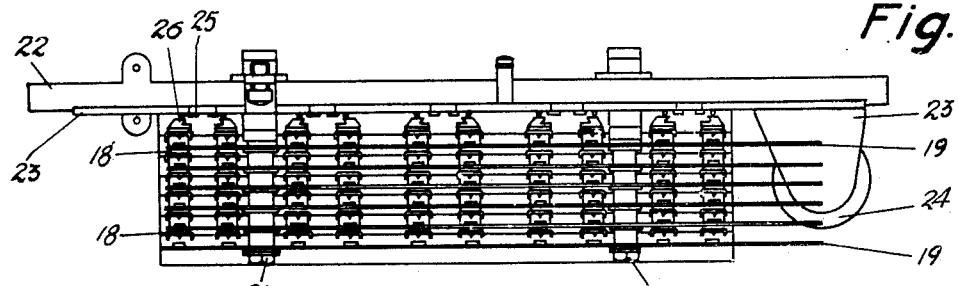
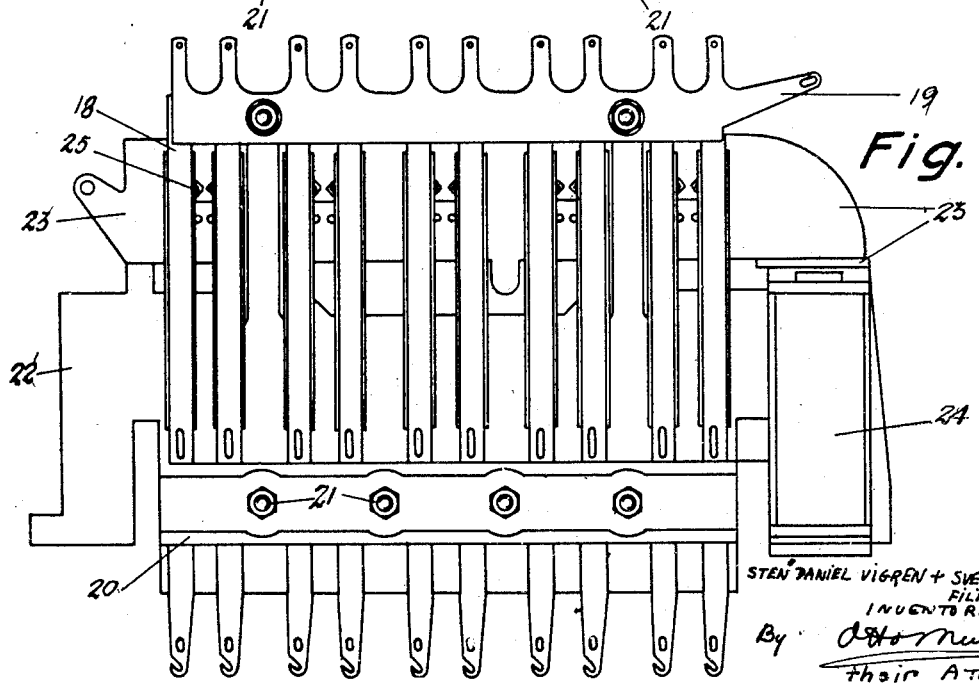

Patented May 2, 1939

2,156,465

UNITED STATES PATENT OFFICE 2,156,465

SET OF CONTACT SPRINGS FOR ELECTRICAL SWITCHING APPARATUS

Sten Daniel Vigren and Sven Gustaf Filip Blomquist, Stockholm, Sweden

Application March 10, 1936, Serial No. 68,014

6 Claims. (Cl. 200—166)

The present invention relates to new and useful improvements in electrical switching apparatus and equipments preferably for telephone and signal systems and refers to improved sets of contact springs for such switching apparatus and equipments, like relays, selectors, crossbar switches, for example for common-battery and automatic telephone, telegraph and signaling systems in general.

It is well known, that the greatest difficulty associated with that kind of switching equipments, has been to find types of contact springs, which give a reliable contact under all conditions, are cheap in manufacture and in mounting and which, above all, require a minimum of adjustment during mounting as well as in service. The problem is thus partly to find a suitable contact spring and partly to mount this spring in association with other similar springs to form a suitable set or group of contact springs.

The present invention solved this and other problems by the construction of improved types of sets of contact springs, which offer great advantages over the springs used heretofore, such as greater reliability without minute and expensive adjustments before and during service, constant contact pressure, even under constant use during long periods of time etc.

Several embodiments of the present invention are illustrated in the accompanying drawings in which—

Figure 1 is a plan view of an ordinary type of multi-contact relay, generally used in automatic telephony and arranged according to this invention.

Figure 2 is an elevational view of the relay shown in Fig. 1 with one break- and one make-contact group.

Figures 3a, 3b, 3c and 3d are elevational, plan and cross sectional views, respectively, of one embodiment of a contact.

Figures 4a, 4b and 4c are elevational, plan and cross sectional views, respectively, of another type of contact spring according to this invention.

Figures 5, 6 and 7 are a bottom plan view, front elevational view and top plan view, respectively, of a unit section of a crossbar switch, intended for 100 numbers, the entire switch being composed of ten such units, each one containing ten sets of multi-contact groups, with each group comprising 6 make-contact spring groups.

Figure 8 is a side elevational view of the support shown in Figs. 1 and 2;

Figure 9 is an elevational view, partly broken away, of another embodiment of the support for the springs;

Figure 10 is a plan view, and

Figure 11 a front elevational view of the same support.

Referring to the drawings and more particularly to Figs. 1 and 2, 1 is a relay frame, which supports the electromagnet M, its armature A, and one or more sets of contact spring groups, according to this invention. Said contact springs are operated by the armature A. In Figs. 1 and 2 there is shown, for sake of simplicity, only one group of springs containing one make- and one break-contact. The frame comprises two screws, 3, for fastening the contact springs S1—S4 to an insulating block 2, consisting of a bottom plate and three insulating washers 5, between which the springs are fastened by means of nuts 4. A plate 6 is disposed on top of spring S1 and insulated from same by an insulation 7. In order to fix the immovable springs S2 and S3 of the contact spring group, a spring support 8, is attached to and forms part of the block 2, said support being provided with alternate openings 11, and tips 12, for cooperation with the lugs 10, of the immovable springs. The movable springs S1 and S4 are operated by the armature by means of specially constructed insulated stud 9, which is fastened to the armature.

The form of the contact spring proper is clearly illustrated in Figs. 3a, 3b, 3c, 4a, 4b, 4c, which show two different embodiments. According to this invention each spring is stiffened part of its length by giving it a U-shaped cross section as in Fig. 3c or a T-shaped cross section as in Fig. 4c. These special cross sections can easily be obtained in one operation, during manufacture of the spring. The special cross sectional shapes shown and described are of course not the only ones conceivable. They represent but examples of how the characteristic stiffening effect of part of the spring, according to the present invention, can be obtained, by shaping said part into a stiff and straight bar. One end of the spring is formed as a soldering eye 13 (Figs. 3b and 4b), while the other end is provided with a contact surface or tip 14 of known shape. The spring is further provided with an aperture 15 for receiving the above mentioned stud 9 (Fig. 2). Aperture 15 is located immediately before the point of junction between the stiffened part and the springy contact end of the spring. Two pointed studs 16 are provided for the proper centering of the spring in the contact group. It will be obvious, however, that other ways can be used for centering or adjusting the springs in relation to other springs of a set. The more or less immovable springs are generally provided with a lug 10, Fig. 3b, to rest on or to be fastened to the holder tip 12, of support 8 (Fig. 8). Between the part of the spring to be fastened and the stiffened part, the spring is further provided with a special hole or opening 15′, whereby the spring at this place is rendered more flexible than at any other place of its entire length.

Another object of the invention is to give to the spring, during its manufacture a certain bend, between the part to be fastened and the stiffened part thereof. In other words the spring is pretensioned. In this way a certain predetermined constant pressure is automatically obtained, by mounting the springs in the corresponding sets of contact springs, so that no adjustment whatsoever, is required. This latter factor was heretofore a great disadvantage in the known contact springs, which caused careful and expensive adjustments with the corresponding loss of time.

Instead of mounting the contact springs individually as here described, they can of course also be held together in groups or sets by casting around them or associating with them an insulating composition to which the springs adhere.

The following valuable features are associated with contact springs according to this invention: The stiffened part of the spring; the point of application of stud 9 for operating the spring situated within the stiffened part of said spring; the support 8, with holder tips 12 which serve to hold the immovable springs in protruding position between the contact springs or act as supports for the lugs 10 (Fig. 3b); another feature is the fact that the holder tips are located within or immediately adjacent to the stiffened part of the springs and the springy action is reserved to a relatively small part of the spring.

The bending i. e. pretensioning of the spring between the part to be fastened and the stiffened part of same, ensures that exact contact pressure is immediately obtained, in assembled position, without expensive subsequent adjustments.

Figures 5, 6 and 7 illustrate the mounting of sets of contact springs, according to this invention, when associated with a crossbar switch or a section unit of the same. A section unit, as shown in Figs. 5, 6 and 7, contains ten sets of contact springs, the immovable springs of which are common to all ten groups. By mounting ten such units in the known way, a hundred number crossbar switch is obtained. (See for instance the British Patent No. 141,005.)

Each set of contact springs, in this particular case, consists of six movable contact springs 18, which may for instance be constructed like those in Figs. 2 or 3a and six immovable contact springs, which are in the form of strips 19, covering all ten sets of the unit. The movable contact springs 18 may be fastened as in the relay, shown in Figs. 1 and 2, or attached in rows to strips of insulating compound, which afterwards are fastened together to form a block or stack 20. Screws and nuts 21, which serve to attach the block to the frame 22, also serve to fasten the stack 20 together. A movable armature 23 is associated with frame 22. Armature 23 is common to all ten groups and associated in the known way with a horizontal magnet 24.

The desired set of contact springs is selected, in the known manner, by means of a vertical and a horizontal bar. The vertical bar is first operated, indicating a certain row of contact groups at right angle to the horizontal sets of contact groups, and in which row the desired contact group is situated. As a result the ten intersecting fingers 25, corresponding to this row, said fingers being indicated in Figs. 5, 6 and 7, are moved under the studs 26, situated under the last movable contact spring in each group. When the desired horizontal bar is thereafter operated by energization of the corresponding horizontal magnet, the said intersecting finger, which corresponds to said set of contact springs, is held between the said horizontal bar and the stud 26, whereby the six movable springs 18, of the group are raised and make contact with the corresponding fixed contact springs of strips 19.

The above mentioned advantages obtained by using contact springs, according to this invention, in combination with crossbar switches are especially important from several points of view. It must merely be considered in this connection that crossbar switch of the type mentioned comprises 600 movable contact springs.

Thanks to the form of contact strips 1, with their relatively short springs and the construction of the movable contact springs 2, each one of the 600 contacts of the switch obtains automatically its predetermined contact pressure, when the contact springs are mounted. Thus, costly adjustment of the springs, associated with known crossbar switches or similar switching equipment which was heretofore required, is entirely eliminated.

An object of this invention is to use the contact springs and groups or sets of the same generally, and we do not wish to be understood as limiting our invention to the exact constructions shown in the drawings.

Thus, the principles embodied in this invention can be used in or applied to all kind of contact springs, be they mounted vertically or horizontally, separately mounted or cast in insulated blocks; either in selfcontained sets of contact springs belonging to the same group or in horizontal or vertical rows belonging to different groups, with the idea of later forming any number of groups with any number of contact springs.

Alternatively and instead of using the lug 10, shown in Fig. 3b on the springs fixed to support 8, (Figs. 1 and 2), said support can be provided with protruding lugs 12, (Fig. 1) or protuberances penetrating between the movable and fixed springs in order to serve as fixed supports for said fixed springs.

There are of course also other ways of fixing the springs in needed positions, but the general object of the invention is the combination of the support 8 (Figs. 1 and 2) with sets of contact springs, whereby the immovable springs are held in fixed position by means of lugs or protuberances of said support 8, or by lugs protruding from the springs, as shown.

Further details of such support are shown by way of example in Figs. 8, 9, 10 and 11. Fig. 8 is a side elevational view of the support shown in Figs. 1 and 2; Fig. 9 is an elevational view, partly broken away, of another embodiment of the support for the springs, in which slits 15 are provided to receive lugs 10 (Fig. 3b); while Fig. 10 is a plan view and Fig. 11 a front elevational view of the same support.

What we claim is:

1. As a new article of manufacture, a contact spring for electromagnetic electrical switching apparatus, said contact spring comprising a metal leaf-spring, the latter being provided with a permanent transverse bend dividing the said leaf-spring in two parts, said two parts being inclined with respect to each other for subsequent pre-tensioning of the said leaf spring, one of said parts being provided with contact means and the other part comprising fastening means, said leaf spring being relatively weak in a zone adjacent the said bend, in order to facilitate hinge-like movements of the spring, for the purposes described.

2. The article claimed in claim 1, in which said leaf spring is further provided with a longitudinal reenforcement disposed between the said contact means and the said bend, a support for said fastening means and supporting the spring and means for straightening out the inclined parts of said spring, whereby the latter is pretensioned.

3. The article claimed in claim 1, in which said leaf spring is provided with a cut-out in the vicinity of said bend and between the latter and the said fastening means, a section of the leaf spring between the contact means and the said bend being bent out of the plane of the leaf spring body whereby the latter is stiffened in the said section and means for straightening out the inclined parts of the spring to pre-tension the latter.

4. The article claimed in claim 1, in which said leaf spring is provided with a cut-out adjacent said bend and between the latter and the said fastening means, a section of the leaf spring between the contact means and the said bend being bent out of the plane of the leaf spring body whereby the latter is stiffened in the said section, said leaf spring being further provided with a supporting lug disposed short of the end of the spring carrying the said contact means, a support associated with the fastening means for supporting the spring and means for straightening out the inclined parts thereof, whereby the said spring is pretensioned.

5. The article claimed in claim 1, comprising a support for said leaf spring, the latter being secured to said support by means of said fastening means, and straightening means associated with said support, said straightening means pressing upon the said leaf-spring at a point between the said contact means and the said bend, for straightening out the inclined parts of the spring, whereby the latter is pre-tensioned.

6. The article claimed in claim 1, comprising a support for said leaf spring, the latter being secured to said support by means of said fastening means, said leaf-spring being provided with a longitudinal reenforcement disposed between the said contact means and the said bend, and straightening means associated with said support, said straightening means pressing upon the said leaf spring at a point within the said reenforced part of the spring for straightening out the inclined parts thereof, whereby the spring is pre-tensioned.

SVEN BLOMQUIST.
STEN DANIEL VIGREN.

CERTIFICATE OF CORRECTION.

Patent No. 2,156,465.  May 2, 1939.

STEN DANIEL VIGREN, ET AL.

It is hereby certified that error appears in the above numbered patent requiring correction as follows: In the grant, lines 1 and 12 respectively, and in the heading to the printed specification, name of second inventor, for "Sven Gustaf Filip Blomquist" read Sven Gustaf Filip Blomqvist; page 3, second column, line 31, signature of first inventor, for "Sven Blomquist" read Sven Blomqvist; in the signature to the drawings, Sheet 1, for "Sven Gustaf Pilip Blomqvist" read Sven Gustaf Filip Blomqvist; and that the said Letters Patent should be read with this correction therein that the same may conform to the record of the case in the Patent Office.

Signed and sealed this 26th day of September, A. D. 1939.

(Seal)

Henry Van Arsdale,
Acting Commissioner of Patents.